Jan. 16, 1962 C. A. ANDERSON 3,017,483
METHOD OF INDUCTION WELDING OF STRANDED ALUMINUM CABLE
Filed June 22, 1959
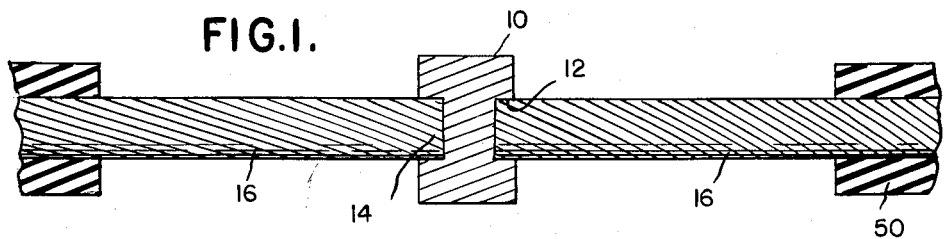
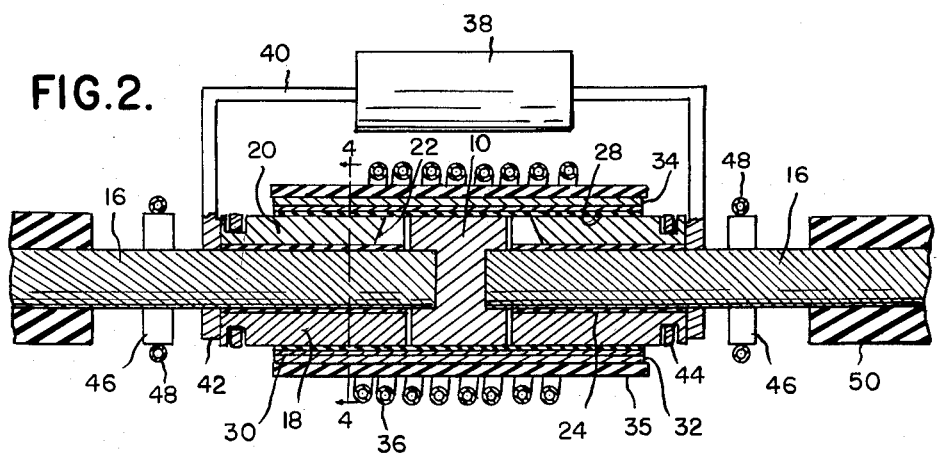
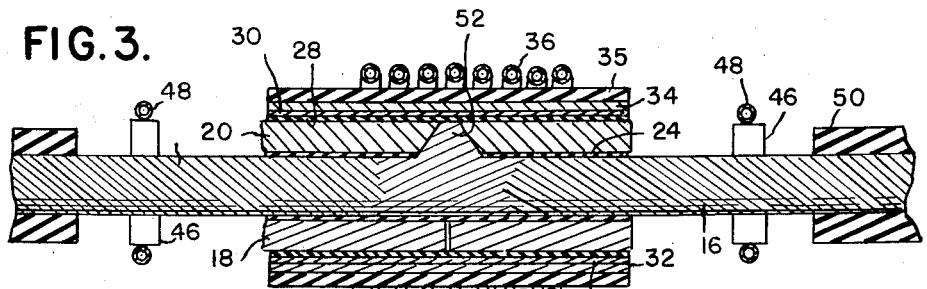
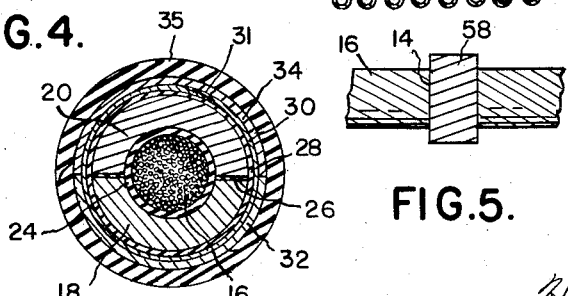
INVENTOR.
CLARENCE A. ANDERSON
BY *Whittemore,*
*Hulbert & Belknap*
ATTORNEYS

United States Patent Office 3,017,483
Patented Jan. 16, 1962

3,017,483
METHOD OF INDUCTION WELDING OF STRANDED ALUMINUM CABLE
Clarence A. Anderson, Dearborn, Mich., assignor to The Detroit Edison Company, Detroit, Mich., a corporation of New York
Filed June 22, 1959, Ser. No. 821,960
16 Claims. (Cl. 219—9.5)

The present invention relates to a method of induction welding of stranded aluminum cable.

It is an object of the present invention to provide a method of welding stranded aluminum cables particularly in sizes of ½ inch diameter and larger so as to produce a weld joint characterized by strength and good electrical conducting properties and free of foreign matter such as welding fluxes which would be harmful to high voltage insulation subsequently applied over the joint.

It is a further object of the present invention to provide a method of welding stranded aluminum cable which comprises melting aluminum in the weld zone, agitating the molten aluminum, and at least partially melting the end portions of the strands of the cable.

It is a further object of the present invention to provide a method of welding stranded aluminum cable as described in the preceding paragraph in which molten aluminum in the weld center is shaped to provide a riser which is subsequently removed after solidifying of the metal.

More specifically, it is an object of the present invention to provide a method of welding stranded aluminum cable which comprises inserting the cable ends into recesses in a solid block of aluminum, subjecting the block of aluminum to an alternating field at a frequency selected to produce efficient heating of the solid aluminum block without substantial direct generation of heat in the stranded cable.

It is a further object of the present invention to provide a method of welding stranded aluminum cable as described in the preceding paragraph in which the frequency of the induction heating field is sufficiently low to produce a vigorous stirring action in the molten aluminum.

It is a further object of the present invention to provide a method as described in the preceding paragraph in which the end portions of the strands of the cables are softened or melted by being washed by the agitated molten aluminum which had comprised the solid aluminum block.

It is a further object of the present invention to provide a method as described in the preceding paragraph in which, after the block has been heated sufficiently to become soft, the softer material of the block is squeezed into a shape constituting a smooth continuation of the cables and an upstanding riser portion.

It is a further object of the present invention to provide a method of welding stranded aluminum cable in which oil is present between the strands, which comprises inserting the ends of the stranded cable in recesses in a block of solid aluminum, confining the end portions of the cable and the block of aluminum, induction heating the block at a frequency which does not substantially heat the strands of the cable, softening and melting the ends of the strands of the cable by heat conduction from the melted block of aluminum, carrying out the operation at a heating intensity to provide time for escape of bubbles in the aluminum and to cause vaporized oil to form a protective atmosphere in the confined space.

Other objects and features of the invention will become apparent as the description proceeds, especially when taken in conjunction with the accompanying drawing, illustrating preferred embodiments of the invention, wherein:

FIGURE 1 is a diagrammatic sectional view showing the association of cable ends in a weld block.

FIGURE 2 is a view showing an assembly of parts for carrying out the welding method.

FIGURE 3 is a view similar to FIGURE 2 showing the relationship of parts after movement of the mold segments.

FIGURE 4 is a sectional view on the line 4—4, FIGURE 2.

FIGURES 5 and 6 are diagrammatic views showing variations of the method.

The problem of joining aluminum conductors is more difficult than that of joining copper conductors because of the rapid formation of a tightly adherent oxide film on the surface of the aluminum on exposure of aluminum to air after any cleaning operation. Several other factors still further complicate the task when the problem is that of joining large aluminum conductors of insulated high voltage cable in underground installations. The conductor may be composed of several hundred strands each having its individual coating of aluminum oxide which must be removed at least partially at the joint between the conductors.

Arc welding of the conductors is difficult because of the presence between the conductor strands of the oil used to impregnate the paper insulation of the cable. Removal of the oil by solvents is not permitted because traces of solvent may remain as a contaminant of the high purity cable insulation. Use of compression sleeves for joining aluminum conductors is widely used, especially for bare conductors on overhead lines, but for insulated high voltage cables the length required for a reliable compression sleeve joint entails much tedious and careful hand work in re-insulating the joint.

In accordance with the present invention the joining of the ends of two large stranded aluminum conductors is by induction melting of a piece of solid aluminum interposed between the two conductor ends, which in turn melts the ends of the conductor strands of the cable by heat conduction thereto. One or more pieces of solid aluminum are placed between the two conductor ends. These may be discs or cylinders of aluminum with a diameter somewhat larger than that of the cable, or an aluminum sleeve may be used encircling the stranded conductors in which case the stranded conductors would be butted together.

However, the presently preferred method is to use a compromise betwen the cylinder and sleeve as shown in FIGURE 1.

Referring now to FIGURES 1–4, the method comprises providing a block 10 of solid aluminum having shallow cylindrical recesses 12 at opposite sides into which the end portions 14 of stranded aluminum cables 16 are inserted. A separable mold structure is provided comprising a pair of lower mold elements 18 and a pair of upper mold elements 20, the latter being provided with riser-forming recesses indicated at 22. The weld zone is further confined by providing ceramic fiber gaskets 24 between the end portions of the cables and the interior surfaces of the mold segments. Gaskets formed of aluminum silicate fibers are suitable for this purpose. Ceramic fiber gaskets 26, as seen in FIGURE 4, are provided between the edges of the mold halves, and ceramic fiber gaskets 28 are provided to surround the outer surfaces of the mold segments. In addition, a stainless steel liner 30 is provided having a length sufficient to wrap substantially more than a complete turn around the structure as seen at 31 in FIGURE 4. This liner is relatively thin and is intended to be used only once. Excellent results have been obtained using a stainless steel liner having a thickness of twelve mils. Surrounding the liner 30 are a lower shell 32 and an upper shell 34, these shells being substantially semi-cylindrical as seen in FIGURE 4. Preferably, a thermally insulating wrapping 35 is provided around the assembly. In FIGURE 3 the turns of the induction heating coil 36 are illustrated. It will be appreciated that since the weld joint may unite extremely long sections of cable, actual practice in the field will be to provide a coil in separable halves. Excellent results have been obtained using a coil formed by a single turn which is thus readily removable laterally from the completed cable.

Pressure means indicated at 38 are provided having arms 40 with yokes 42 engaging the ends of the molds as shown. Mold elements 18 and 20 are held together by clamps, portions of which are seen at 44.

Spaced outwardly from the mold segments are cooling devices indicated generally at 46 having cooling coils 48 associated therewith through which a cooling liquid is circulated. The end portions of the cables 16 are bared as illustrated in the figures, a portion of the cable insulation being indicated at 50.

In the operation the ends of the stranded cable are inserted into the recesses 12 of the block 10. Next, the mold segments 18 and 20 are assembled on the portions of the cable end adjacent the block 10, the ceramic fiber gaskets 24 being inserted, and the gaskets 26 being provided between the edges of the mold segments. The ceramic fiber gaskets 28 are then provided over the exterior of the mold segments 18 and 20. Then the liner 30 is wrapped tightly around the assembly to confine the weld zone and thereafter the semi-cylindrical shells 34 are placed around the liner. Preferably, the entire assembly is then wrapped with a suitable thermal insulator 35.

The induction heating coil 36 is moved to the position illustrated in FIGURE 3 to surround the weld zone. It will be appreciated that if multiple turns are provided, the coil must be formed in lateral separable parts for removal. Alternatively, a coil of a single turn may be provided in which the turn may be shaped or expanded to permit ready removal from the welded cable.

With the parts assembled as shown in FIGURE 2, and with the cooling fluid circulating through the coils 48, alternating current is applied to the coil 36. Low frequency induction heating is used to melt the solid aluminum. The actual frequency selected may vary with the size of the cable but in general it is of a frequency which will not produce substantial heating by induction of the stranded cable. Frequencies between 25 and 3000 cycles are suitable and for small cable such for example as ½ inch cable, the frequency is preferably in the upper range, near 3000 cycles. However, for commonly used 1-inch and 1½-inch cable, excellent results are obtained with the readily available 60-cycle current and this is normally used.

The heating intensity is selected so as to produce a rather gradual heating so that the heating cycle may take several minutes. While the induction heating is of course concentrated primarily in the outer portion of the aluminum block, heat is conducted rapidly to the interior of the block and more slowly from the block to the cable ends. After the block is melted heat transfer to the stranded cable from the magnetically agitated molten aluminum is rapid.

After the heat has been generated in the aluminum a sufficient length of time to melt all of the solid aluminum and a portion of each stranded cable end the molten mass is allowed to solidify, the mold and associated structure are removed, and the excess aluminum is trimmed off to produce a smooth contour over the length of the joint.

A refinement of this process involves the movement of the mold segments 18 and 20 toward each other to the position shown in FIGURE 3, after the solid aluminum block 10 has been completely melted or is at least quite plastic. This permits shaping the joint to approximate form which as seen in FIGURE 3 includes a riser portion 52 in which the final shrinkage pocket occurs as the metal solidifies.

The cooling devices or clamps 46 prevent conduction of heat to the insulating material 50 and thus reduce the length of insulation which must be stripped from the cable prior to the making of the joint.

An important advantage of using a frequency so low as to generate no more than a negligible amount of heat in the insulated conductor is that this low frequency produces a vigorous magnetic stirring action in the molten aluminum. Without this stirring or some other artificially produced motion the aluminum oxide on the ends of the strands would remain in its original alignment in the molten mass and thereby form a fracture plane after solidification, in addition to forming a plane of high electrical resistance. The vigorous stirring disperses the aluminum oxide throughout the molten mass, thus rendering it relatively harmless.

The purpose of using solid pieces of aluminum with a diameter larger than that of the cable is four-fold: (1) to provide excess material which can flow into the interstices between strands of the cable; (2) to furnish a volume throughout which the aluminum oxide from the strands can be dispersed; (3) to provide space outside the cable diameter in which to collect gas bubbles from vaporized oil; and (4) to provide space outside the cable diameter in which the shrinkage pocket can form while the molten aluminum solidifies.

When the aluminum cylinder or block begins to melt, a light pressure by the squeeze mechanism 38 on the mold segments, tending to cause axial approach therebetween, will push molten aluminum into the fiber gaskets until it reaches a zone cold enough to freeze it. A temperature gradient exists from the 1200 plus degrees Fahrenheit in the molten aluminum at the center of the weld zone down to 200 degrees Fahrenheit or cooler in the conductor beyond the cooling clamps. As power is continuously fed into the aluminum from the inductor coil the molten zone widens. If sufficient power is used the freezing zone in the fiber gasket moves outwardly until molten aluminum starts to escape beyond the mold. At that time the squeeze mechanism is actuated to push the mold parts together until they meet, the power is turned off, and the metal is allowed to solidify. Since the principal loss of heat is by way of the cooling clamps, the metal freezes from the ends toward the center. The riser is the last part to freeze so that the final shrinkage pocket occurs in the riser. After the metal has solidified the parts of the mold are separated and the riser is cut off.

In FIGURE 5 there is shown a modification of the present invention in which the end portions 14 of the cable 16 are brought into abutment or juxtaposition to end surfaces of a solid aluminum block 58 preferably in the form of a cylinder.

In FIGURE 6 an additional variation of the invention is shown in which the end portions 14 of the stranded cable 16 are brought into abutment in a hollow cylindrical body or sleeve 60 formed of solid aluminum.

In the constructions shown in FIGURES 5 and 6 it will be understood that the intermediate block 58 or the cylindrical tubular body 60 is melted by induction heating and the melted aluminum of the block or tubular body melts end portions of the strands of the conductor. In both cases of course the induction melting of the solid aluminum body is carried out while the ends of the conductors or cables and the solid aluminum bodies are confined.

An additional advantage is obtained from the present method in that the traces of oil present between the strands of the cable are vaporized, and by expansion tend to displace or purge the air present in interstices within the volume enclosed by the mold parts at the time of assembly. Some of this oil vapor remains behind to serve as a protective atmosphere for the molten aluminum during the agitation period when air could be harmful.

It is desirable for the heating operation to be carried out gradually over a substantial interval to allow for escape of gas bubbles produced in the molten aluminum.

The drawing and the foregoing specification constitute a description of the improved method of induction welding of stranded aluminum cable in such full, clear, concise and exact terms as to enable any person skilled in the art to practice the invention, the scope of which is indicated by the appended claims.

What I claim as my invention is:

1. The method of welding stranded aluminum cable which comprises confining a block of solid aluminum of a transverse dimension greater than the diameter of the stranded cable between and in contact with cable ends, melting the block by induction heating at a frequency which is substantially ineffective to melt the stranded cable, effecting substantial melting of the ends of the strands of the cable by heat transferred thereto primarily from aluminum melted from the aluminum block, and effecting vigorous stirring of the molten aluminum by the alternating field, and causing the molten aluminum to solidify.

2. The method as defined in claim 1 in which the block is of substantially cylindrical shape having flat ends.

3. The method as defined in claim 1 in which the block is in the form of a body having axially aligned recesses having a wall portion between their inner ends, the recesses being shaped to receive the cable ends.

4. The method as defined in claim 1 in which the block is in the form of a body having axially aligned recesses intersecting at their inner ends to form a continuous opening through the body.

5. The method as defined in claim 1 in which the space in which the block is confined includes a portion shaped to provide a riser in the solidified aluminum.

6. The method as defined in claim 1 which comprises the final step of machining the joint to the approximate diameter of the stranded cable.

7. The method of welding stranded aluminum cable which comprises inserting cable ends in recesses in a block of solid aluminum, melting said block by induction heating in an alternating field at a frequency which is insufficient to effect substantial melting of said cable, partially melting the inserted ends of the cable primarily by heat transfer from the melted block, producing a stirring of molten aluminum by induction, and confining the molten aluminum to shape the resultant weld.

8. The method of welding stranded aluminum cable which comprises inserting cable ends in recesses in a block of solid aluminum, melting said block by induction heating in an alternating field at a frequency which is insufficient to effect substantial melting of said cable, partially melting the inserted ends of the cable primarily by heat transfer from the melted block, producing a stirring of molten aluminum by induction, and confining the molten aluminum as it solidifies in a form having a riser for gas bubbles and a shrinkage pocket.

9. The method as defined in claim 8 which comprises the final step of machining the joint to the approximate diameter of the stranded cable.

10. The method of welding stranded aluminum cable which comprises inserting cable ends in recesses in a block of solid aluminum, melting said block by induction heating in an alternating field at a frequency which is insufficient to effect substantial melting of said cable, partially melting the inserted ends of the cable primarily by heat transfer from the melted block, producing a stirring of molten aluminum by induction, and squeezing the molten aluminum into a shape constituting a continuation of the cable with a riser at the joint.

11. The method of providing a weld joint between the ends of stranded aluminum cable which comprises inserting the cable ends in recesses in a block of solid aluminum, confining the weld zone, applying an alternating field to the weld zone at a frequency to melt the block without substantial melting of the end portions of the cable by induction heating while producing an effective stirring of the molten aluminum, partially melting the inserted ends of the cables primarily by heat transfer from the melted aluminum of the block.

12. The method of providing a weld joint between the ends of stranded aluminum cable which comprises inserting the cable ends in recesses in a block of solid aluminum, confining the weld zone, cooling portions of the cables adjacent to the inserted ends thereof, applying an alternating field to the weld zone at a frequency to melt the block without substantial melting of the end portions of the cable by induction heating while producing an effective stirring of the molten aluminum, partially melting the inserted ends of the cables primarily by heat transfer from the melted aluminum of the block.

13. The method of providing a weld joint between the ends of stranded aluminum cable which comprises inserting the cable ends in recesses in a block of solid aluminum, confining the weld zone, applying an alternating field to the weld zone at a frequency to melt the block without substantial melting of the end portions of the cable by induction heating while producing an effective stirring of the molten aluminum, partially melting the inserted ends of the cables primarily by heat transfer from the melted aluminum of the block, and shaping the melted aluminum into a form providing a continuation of the cables and an integral upstanding riser.

14. The method as defined in claim 13 which comprises the final step of removing the riser.

15. The method of providing a weld joint between the ends of stranded aluminum cable which comprises inserting the cable ends in recesses in a block of solid aluminum, confining the weld zone, cooling portions of the cables adjacent to the inserted ends thereof, applying an alternating field to the weld zone at a frequency to melt the block without substantial melting of the end portions of the cable by induction heating while producing an effective stirring of the molten aluminum, partially melting the inserted ends of the cables primarily by heat transfer from the melted aluminum of the block, squeezing the molten aluminum into a shape providing continuation of the cables and an upstanding riser, and causing the metal to solidify.

16. The method as defined in claim 15 which comprises the final step of removing the riser.

References Cited in the file of this patent

UNITED STATES PATENTS

| | | |
|---|---|---|
| 1,646,862 | Haskins | Oct. 25, 1927 |
| 1,809,468 | Bornand et al. | June 9, 1931 |
| 2,706,212 | Rohn | Apr. 12, 1955 |
| 2,737,567 | Bohner et al. | Mar. 6, 1956 |
| 2,751,479 | Cowan | June 19, 1956 |
| 2,767,290 | Chapman et al. | Oct. 16, 1956 |
| 2,769,231 | Grenell | Nov. 6, 1956 |
| 2,796,511 | Steele | June 18, 1957 |
| 2,866,077 | Morton et al. | Dec. 23, 1958 |
| 2,914,641 | Yuhasz | Nov. 24, 1959 |

FOREIGN PATENTS

| | | |
|---|---|---|
| 308,608 | Switzerland | Oct. 1, 1955 |